Patented Feb. 6, 1934

1,946,094

UNITED STATES PATENT OFFICE 1,946,094

TREATMENT OF HYDROCARBON OILS

Jacque C. Morrell and Gustav Egloff, Chicago, Ill., assignors to Universal Oil Products Company, Chicago, Ill., a corporation of South Dakota No Drawing. Application February 16, 1931
Serial No. 516,274

6 Claims. (Cl. 196—36)

This invention relates to the treatment of hydrocarbon oils, and refers more particularly to the refining of relatively low boiling hydrocarbon distillates at elevated temperatures, especially those resulting from the conversion of relatively high boiling hydrocarbons at elevated temperatures.

More specifically the invention comprises subjecting hydrocarbon oil vapors to treatment with mixtures of sulfur trioxide and steam in the presence of solid contact materials of a non-metallic nature, such as fuller's earth, clays, bentonite, bauxite, crushed firebrick, pumice stone and other materials of an earthy or siliceous nature. Oxygen-containing gases, such as air, oxygen, ozone alone or in combination may be employed also together with the sulphur trioxide and steam, ozonized air having been found to be particularly efficacious in some instances. To cut down the violence of the reaction flue gases carbon dioxide and the like may be used together with the sulphur trioxide and steam.

In some cases the contact masses may be mixed with minor amounts of materials of a basic nature, such as metals or their oxides, these resulting in some instances from the decomposition of salts of the metals incorporated with the earthy materials prior to their roasting and in other instances from disintegration reaction of the earthy materials during their use in the process. The effect of the bases may be of a chemical or merely of a catalytic nature.

The invention is more particularly directed to the treatment of vapors of lower boiling cracked distillates though straight run distillates may also be treated within the scope of the invention.

The usual method of refining cracked distillates is to subject them to treatment with sulphuric acid and alkaline solutions, including plumbite solutions consisting of litharge dissolved in alkaline solutions in various combinations of treatment and subsequently to subject the acid treated product to redistillation usually in the presence of steam. The present invention permits the direct treatment of the hydrocarbon vapors from the cracking process, reducing the cost of reagents and eliminating the redistillation or rerunning operation, although it is within the scope of the invention to revaporize the product in a subsequent operation and subject the vapors to treatment as described.

In applying the process of the invention to practice any suitable equipment may be employed which will permit the contacting of the hydrocarbon vapors and the treating gases employed with the solid contacting or polymerizing materials; for example, a suitable tower or chamber packed with a selected mixture of contact materials may be employed following the fractionator of a cracking system, the gaseous reagents being introduced at a suitable point or points along the line of flow of the ascending or descending vapors, thus permitting contact with the solid materials of the mixture of hydrocarbon oil vapors and the gaseous treating mixtures. Similarly, any device which permits the efficient contacting of the hydrocarbon vapors undergoing treatment with the gases and solids may be employed. The solid contacting materials may sometimes be employed in successive strata of varying composition.

It has been found desirable to neutralize the vapors before or after condensation, and to this end the vapors may be treated with ammonia gas or pass counterflow to solutions of alkalis in auxiliary neutralizing equipment or the condensed vapors may be treated with liquid alkalis such as solutions of caustic soda, ammonia or the like, the traces of reagents and reaction products remaining being washed out with water when found necessary.

The treatment of hydrocarbon vapors with mixtures of sulfur trioxide and steam in varying proportions has been found to produce substantially the same effects upon the distillates as result when they are treated with sulfuric acid in the liquid state. Since the reactions characteristic of the present invention take place between substances which are substantially in vapor form, more intimate contact is possible on account of the ready diffusibility of substances in the vapor state, resulting in considerable saving in the amount of treating reagents needed to produce distillates of a proper degree of refinement. The amounts of the reagents used will vary with the character of the vapors treated, the amount of anhydrous sulfur trioxide used varying from that equivalent to one pound per barrel of sulfuric acid to as high as fifteen pounds per barrel in rare instances. The proportions of sulfur trioxide and steam may also be varied to produce a wide variety of treating effects. When it is desired to moderate the oxidizing tendencies of the sulfur trioxide more steam may be used and less oxidizing gases, and when a high degree of oxidation is required the amount of steam may be reduced to zero and the amount of oxidizing gases increased to a considerable percent of the sulfur trioxide. The effect of treatments of this nature is to produce compounds between unsaturated constituents and sulfuric acid and to induce polymerizing and condensing reactions upon components of the vapors which would tend to deposit gums or resins if allowed to remain in the condensed distillate. The reactions may also be directed toward the removal of sulfur bodies, many of these being readily reactive with reagents of the type employed.

Various temperatures of treatment may be employed, for example, from 250-600° F., more or less, and the pressures may be subatmospheric, atmospheric, or superatmospheric. While the results may vary with the conditions employed, the pressures and temperatures are chosen so that the hydrocarbons are treated substantially in the vapor phase.

As specific examples of the operation of the process of the invention and of the results obtained, a California cracked distillate of approximately motor fuel boiling range may be vaporized and subjected to treatment with a mixture of sulfur trioxide, oxygen and steam during the passage of the vapors through a stationary mass of finely divided clay in a downward direction. The sulfur trioxide may be used in an amount equivalent to approximately three pounds per barrel of condensed vapors with a small amount of oxygen and an amount of steam necessary to increase the velocity of the vapors to keep the mixture of clay washed free of reaction products such as polymerized bodies and sludges. The untreated product may show a gum content of approximately 500 mgs. per 100 ccs., have a reddish brown color and a sulfur content of approximately 0.5%. The treated product after suitable separation from spent reagents, neutralizing with alkalis and washing with water may show a gum content of approximately 30 mgs., a color of plus 25 on the Saybolt scale and a sulfur content as low as 0.2%.

In the case of a mixed Mid-Continent and West Texas cracked distillate treated with approximately the same amounts of reagents, the gum content may be reduced from 300 mgs. to 11 and the color raised from a light amber to approximately 25 on the Saybolt scale. The sulfur content may be reduced from 0.4% to approximately 0.15%.

The process of the invention is particularly suitable to the treatment of cracked distillates produced from California oils. In some cases the untreated distillates may contain 600 mgs. of gum and have a dark reddish color, while the treated distillates may have a gum content of only 50 mgs. and a color of 25 to 30 on the Saybolt scale. The sulfur content may be reduced from 0.5% to 0.1%.

The foregoing description and examples have disclosed a process applicable to the treatment of hydrocarbon oil vapors which has a wide applicability and is capable of great variations in the methods of operation and the amounts of reagents employed. Therefore, the specific cases cited are not to be construed in a limiting sense upon the broad scope of the invention as many other modifications and examples can be given.

We claim as our invention:

1. A step in the refining of the overhead products resulting from hydrocarbon oil cracking, which comprises subjecting said products in heated vaporous condition to the action of sulphur trioxide and steam in the presence of a non-metallic solid contact agent, the quantity of sulphur trioxide being not substantially in excess of that necessary to remove sulphur and gum forming bodies from the distillate.

2. A step in the refining of the overhead products resulting from hydrocarbon oil cracking, which comprises subjecting said products in heated vaporous condition to the action of sulphur trioxide and steam in the presence of bauxite, the quantity of sulphur trioxide being not substantially in excess of that necessary to remove sulphur and gum forming bodies from the distillate.

3. A step in the refining of the overhead products resulting from hydrocarbon oil cracking, which comprises subjecting said products in heated vaporous condition to the action of sulphur trioxide and steam in the presence of fuller's earth, the quantity of sulphur trioxide being not substantially in excess of that necessary to remove sulphur and gum forming bodies from the distillate.

4. A step in the refining of the overhead products resulting from hydrocarbon oil cracking, which comprises subjecting said products in heated vaporous condition to the action of sulphur trioxide and steam in the presence of a zeolite, the quantity of sulphur trioxide being not substantially in excess of that necessary to remove sulphur and gum forming bodies from the distillate.

5. In the refining of cracked hydrocarbon distillates the step which comprises passing the distillate in vapor form with sulphur trioxide, steam and an oxygen-containing gas through an earthy contacting material, the quantity of sulphur trioxide being not substantially in excess of that necessary to remove sulphur and gum forming bodies from the distillate.

6. In the refining of cracked hydrocarbon distillates the step which comprises passing the distillate in vapor form with sulphur trioxide and steam through a solid contact mass containing a basic material, the quantity of sulphur trioxide being not substantially in excess of that necessary to remove sulphur and gum forming bodies from the distillate.

JACQUE C. MORRELL.
GUSTAV EGLOFF.